United States Patent [19]
Akiyama et al.

[11] Patent Number: 5,827,569
[45] Date of Patent: Oct. 27, 1998

[54] HYDROGEN SEPARATION MEMBRANE AND PROCESS FOR PRODUCING THE SAME

[76] Inventors: Shigeo Akiyama, 2-12-9-304, Amakubo, Tsukuba city, Ibaraki; Hiroshi Anzai, 5-8-5, Kugenumakaigan, Fujisawa city, Kanagawa; Shigeharu Morooka, 3-29-2, Miwadai, Higashi-ku, Fukuoka city, Fukuoka; Hideaki Maeda, 3-10-25, Hakomatsu, Higashi-ku, Fukuoka city, Fukuoka; Katsuki Kusakabe, 6-1-435, Chihaya, Higashi-ku, Fukuoka city, Fukuoka, all of Japan

[21] Appl. No.: 508,506

[22] Filed: Jul. 28, 1995

[30] Foreign Application Priority Data

Jul. 29, 1994 [JP] Japan ................................. 6-196228

[51] Int. Cl.⁶ ............................. B01D 71/02; B05D 5/00
[52] U.S. Cl. ............................. 427/243; 96/11; 427/255; 427/255.3
[58] Field of Search ................. 95/55, 56; 96/4, 96/8, 10, 11; 427/228, 243, 248.1, 255, 255.1, 255.2, 255.3

[56] References Cited

U.S. PATENT DOCUMENTS

| | | | |
|---|---|---|---|
| 3,717,525 | 2/1973 | Bültemann | 96/11 X |
| 4,649,063 | 3/1987 | Canova et al. | 427/255 X |
| 4,689,150 | 8/1987 | Abe et al. | 96/11 X |
| 4,845,054 | 7/1989 | Mitchener | 427/255.3 X |
| 4,849,259 | 7/1989 | Biro et al. | 427/255 X |
| 4,902,307 | 2/1990 | Gavalas et al. | 96/10 X |
| 5,069,930 | 12/1991 | Hussla et al. | 427/255 X |
| 5,160,352 | 11/1992 | Najjar et al. | 95/55 X |
| 5,204,141 | 4/1993 | Roberts et al. | 427/255 X |
| 5,250,184 | 10/1993 | Maier | 96/10 X |
| 5,271,972 | 12/1993 | Kwok et al. | 427/255 X |
| 5,332,597 | 7/1994 | Carolan et al. | 427/255 X |
| 5,356,722 | 10/1994 | Nguyen et al. | 427/255 X |
| 5,360,635 | 11/1994 | Richards et al. | 427/255 X |
| 5,415,891 | 5/1995 | Liu et al. | 95/55 X |
| 5,453,298 | 9/1995 | Gavalas | 96/10 X |

FOREIGN PATENT DOCUMENTS

| | | | |
|---|---|---|---|
| 53-043153 | 11/1978 | Japan | 95/56 |
| 61-238303 | 10/1986 | Japan | 96/11 |
| 1-119324 | 5/1989 | Japan | 96/4 |
| 1-131004 | 5/1989 | Japan | 96/4 |
| 1-310714 | 12/1989 | Japan | 96/10 |
| 6-114230 | 4/1994 | Japan | 96/11 |

*Primary Examiner*—Robert Spitzer
*Attorney, Agent, or Firm*—Barnes & Thornburg

[57] ABSTRACT

A hydrogen separation membrane having a good hydrogen selective permeance and a high stability, without any deterioration, even if exposed to a high temperature atmosphere or steam, which comprises a porous ceramic membrane with $SiO_2$ deposited and filled into pores on the surface of the membrane and a $SiO_2$ thin film formed on the surface of the membrane as a hydrogen selectively permeable film is produced by introducing a vaporized $SiO_2$ source into pores on the surface of a porous ceramic membrane by suction established by providing a pressure difference between both sides of the membrane and thermally decomposing the $SiO_2$ source, thereby forming, depositing and filling $SiO_2$ into the pores and fully coating the outer surface of the membrane with a $SiO_2$ thin film simultaneously where the $SiO_2$ source is preferably a tetra(lower alkoxy)silane and the deposition of the $SiO_2$ source is preferably carried out by a chemical vapor deposition process.

14 Claims, 8 Drawing Sheets

HYDROGEN SEPARATION MEMBRANE AND PROCESS FOR PRODUCING THE SAME

BACKGROUND OF THE INVENTION

1. Field of the Invention

The present invention relates to a hydrogen separation membrane and a process for producing the same, and more particularly to a hydrogen separation membrane comprising a porous ceramic membrane provided with a hydrogen selectively permeable film formed thereon and a process for producing the same.

2. Related Prior Art

Porous ceramic film have been so far used in gas separation at elevated temperatures, separation of a mixture of various organic solvents, etc., because of their distinguished heat resistance, chemical resistance, etc. More specifically, Vycor glass is known as a porous ceramic membrane applicable, for example, to a process based on separate phase phenomena. Vycor glass has good heat resistance and corrosion resistance because of its high content of silicate salt, but has such a disadvantage as a low permselectivity because of larger pore sizes than about 40 Å.

Thus it has been studied to form a separating thin film layer having much smaller pore sizes on the surface of said separate phase glass or porous ultrafiltration membrane as a support. It has been proposed to form the separating thin film layer by a sol-gel process, a CVD process, a hydrothermal synthesis process, an electrode oxidation process, etc., among which only $SiO_2$ thin films formed by the sol-gel process or the CVD process using silanes or chlorides have high separation effects.

However, the separation effects of these $SiO_2$ thin films are still not satisfactory. That is, a $H_2$ permeance is in the order of $10^{-8}$ mole/(m$^2 \cdot$sec$\cdot$Pa) and a $H_2/N_2$ separation ratio is also about 1,000 or less. Thus $SiO_2$ thin films having much higher separation effects have been desired for membranes for high purity hydrogen separation.

SUMMARY OF THE INVENTION

An object of the present invention is to provide a hydrogen separation membrane based on a $SiO_2$ thin film as a hydrogen selective permeation film, which shows good hydrogen permselectivity and hydrogen permeance and a good stability without any deterioration even if exposed to a high temperature atmosphere or steam, and is also to provide a process for producing the same.

DETAILED DESCRIPTION OF THE INVENTION

According to the present invention, there is provided a hydrogen separation membrane which comprises a porous ceramic membrane whose pores are filled with $SiO_2$ and whose outer surface is fully coated with a SiO thin film simultaneously.

The present hydrogen separation membrane is produced by introducing a vaporized $SiO_2$ source into pores on the surface of a porous ceramic membrane by suction established by providing a pressure difference between both sides of the porous ceramic membrane and thermally decomposing the $SiO_2$ source, thereby forming, depositing and filling $SiO_2$ into the pores and fully coating the outer surface of the membrane with a $SiO_2$ thin film simultaneously. It is preferable to deposit and fill pores with $SiO_2$ by a CVD process, using tetra(lower alkoxy)silane as a $SiO_2$ source.

The porous ceramic membrane for use as a support has an average porosity of about 20 to about 60%, preferably about 40 to about 60% and an average pore size of about 5 to about 5,000 nm, preferably about 50 to about 500 nm, and is selected from porous membranes of ceramics such as α-alumina, silica, zirconia, etc., alone or in their mixtures or composites. The membrane form is preferably a hollow filament form, but a film form or a sheet form can be also used.

Porous ceramic membrane with a γ-alumina thin film formed on the surface by a sol-gel process can be also used as a support in the present invention. Formation of the γ-alumina thin film by a sol-gel process can be carried out as follows: aluminum isopropoxide is hydrolyzed and then peptized with an acid, thereby preparing a boehmite sol. Then, a boehmite gel film is formed on the porous ceramic membrane by dip coating of the membrane with the boehmite sol (pickup speed: 0.5~2.0 mm/sec) and dried overnight at room temperature and fired at about 400° to about 800° C. for about 5 to about 10 hours. This operation is carried out by at least one run, and generally by a plurality of runs.

Deposition and filling of $SiO_2$ into pores of the porous ceramic membrane can be carried out by introducing a vaporized $SiO_2$ source into pores of porous ceramic membrane by suction established by providing a pressure difference between both sides of the membrane, thereby forming, depositing and filling $SiO_2$ into the pores. The deposited $SiO_2$ also fully coats the outer surface of the membrane simultaneously as a $SiO_2$ thin film.

$SiO_2$ source for use in the present invention includes tetra(lower alkoxy)silanes such as tetraethoxysilane, tetramethoxysilane, etc. A CVD (chemical vapor deposition) process which can thermally decompose the $SiO_2$ source to readily form a $SiO_2$ thin film is applied to the porous ceramic membrane. Any other $SiO_2$ sources than tetra(lower alkoxy) silanes can be also used, so long as they can form $SiO_2$ by any type of reaction.

Application of the CVD process to a porous ceramic hollow filament membrane is carried out in an apparatus shown in FIG. 1. That is, a reactor tube 2, in which a porous ceramic hollow filament membrane 1 or the same porous ceramic hollow filament membrane 1 with a γ-alumina thin film formed on the surface of the membrane by a sol-gel process is coaxially fixed, is kept at a predetermined temperature in a tubular electric furnace 3, using a thermocouple 4. The porous ceramic hollow filament membrane 1 is made so that the central region of the membrane, in which a $SiO_2$ thin film is to be deposited, can be located in a uniformly heated region of the reactor tube 2. Both end regions, that is, other regions than the central region, in which a $SiO_2$ film is to be deposited, of the hollow filament membrane 1 are gas-tightly glazed with glass, for example, $Na_2O$—$B_2O_3$—$SiO_2$-based glass at one end and connected to an evacuating line 14 at other end.

Forming, depositing and filling operations are carried out in the following manner: at first, a valve 15 downstream of a bubbler 5 is closed and the reaction system is evacuated by a rotary pump 6. Then, a $SiO_2$ source [tetra(lower alkoxy) silane] 9 in the bubbler 5 set in a water bath 8 heated by an electric heater 7 is introduced into the space 16 between the outer side of the hollow filament membrane 1 and the reactor tube 2 together with a nitrogen gas carrier at a volume flow rate by several tens to several hundreds larger than that of the $SiO_2$ source, where a feed line 17 is thermally insulated, as shown by dotted lines. Flow rate of the nitrogen gas is controlled by a flow rate controller 10 and measured by a flow rate meter 18. Pressure at the outlet of the porous hollow filament membrane is measured by a Pirani gage 11. Vent gas flow rate through the space 16 between the outer side of the membrane 1 and the reactor tube 2 is measured by a soap-film flow rate meter 12.

Pressure at the outlet of the hollow filament membrane is set to about 0.5 to about 5 kPa, preferably about 1.7 to about 1.8 kPa at the initial stage of reaction, when a porous α-alumina hollow filament membrane having an average porosity of about 40% and an average pore size of about 150 nm or the porous α-alumina hollow filament membrane with a γ-alumina thin film formed on the surface of the membrane by a sol-gel process is used as a porous ceramic membrane, tetraethoxysilane is used as a $SiO_2$ source and a quartz tube having 9.8 mm in inner diameter and 150 mm long is used as a reactor tube. When vaporized tetraethoxysilane as the $SiO_2$ source is introduced into the reactor tube together with the nitrogen gas carrier under the above-mentioned pressure conditions for introducing the $SiO_2$ source into pores of the porous ceramic membrane by suction for a predetermined time, which depends on temperature conditions, while keeping the temperature of uniformly heated region of the reactor tube at about 200° C. or higher, preferably at about 500° C. or higher, more preferably at about 600° C. or higher, $SiO_2$ is gradually formed and deposited to fill the pores on the surface of the ceramic hollow filament membrane as a support. With gradual filling of the pores with $SiO_2$, the pressure at the outlet of the porous ceramic hollow filament membrane is lowered ultimately to about 100 to about 10 Pa from the above-mentioned initial pressure. Up to this time, substantially all the pores on the outer surface of the hollow filament membrane as a support are filled with $SiO_2$ and a hydrogen separation membrane with a pinhole-free $SiO_2$ thin film on the surface is obtained.

It is preferable to introduce a tetra(lower alkoxy)silane together with a nitrogen gas carrier into the space 16 between the outer side of the hollow filament membrane 1 and the reactor tube 2, while heating the reactor tube 2 to the above-mentioned uniformly heating temperature in advance, whereby the hydrogen gas permeance is much more increased. Furthermore, it is also possible to pretreat the pores on the outer surface of the membrane 1 by supplying the tetra(lower alkoxy)silane into the space 16 without evacuation of the inside of the membrane 1, and then conduct the evacuation to form and deposit $SiO_2$ to fill the pores. By carrying out the pretreatment, the $SiO_2$ thin film can be made much thinner than the film obtained without the pretreatment and thus the hydrogen gas permeance can be much improved.

According to the present invention, a hydrogen separation membrane with a high hydrogen selective permeance and a high stability, even if exposed to a high temperature atmosphere or steam, can be obtained by depositing and filling $SiO_2$ into pores on the surface of a porous ceramic membrane as a support and fully coating the surface with $SiO_2$. Particularly in case of a porous ceramic membrane with a γ-alumina thin film formed on the surface of the membrane by a sol-gel process, the hydrogen gas permeance is much improved, i.e. the $SiO_2$ thin film deposited on the surface of the membrane can be made much thinner.

PREFERRED EMBODIMENTS OF THE INVENTION

The present invention will be explained in detail below, referring to Examples.

EXAMPLE 1

Figure 1:
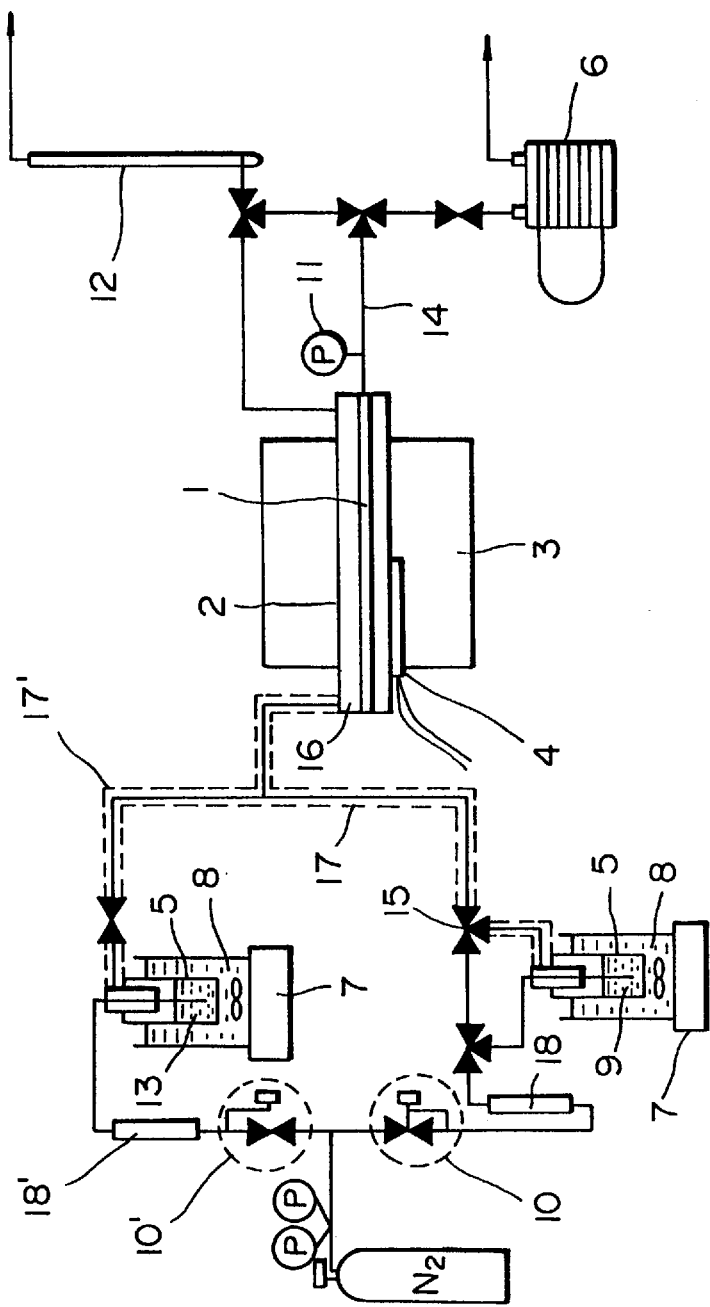
FIG. 1 is a schematic diagram of a CVD apparatus for producing a hydrogen separation membrane ($SiO_2$-deposited support) according to the present invention.

A CVD process was applied to porous α-alumina hollow filament membranes (outer diameter: 2.6 mm; inner diameter: 2.0 mm; average porosity: 40%; average pore size: 150 nm) as porous ceramic membrane supports in an apparatus shown in FIG. 1, using tetraethoxysilane as a $SiO_2$ source and a quartz tube (inner diameter: 9.8 mm; length: 150 mm) as a reactor tube.

At first, a valve 15 downstream of a bubbler 5 is closed and the inside of the reaction tube 2 was evacuated by a rotary pump 6. Then, the valve 15 is opened, and tetraethoxysilane 9 in the bubbler 5 set in a water bath 8 heated by an electric heater 7 was introduced together with a nitrogen gas carrier into the space 16 between the outer side of the hollow filament membrane 1 and the reactor tube 2 at a nitrogen gas flow rate of $3.8 \times 10^{-3}$ mole/sec and at a tetraethoxysilane flow rate of $1.1 \times 10^{-5}$ mole/sec, while continuing the evacuation by the rotary pump 6.

Under these conditions, the reactor tube 2 was heated to a reaction temperature (temperature in the uniformly heated region of reactor tube 2) of 600° C. at a temperature elevation rate of 3.2° C./min. and kept constant at that temperature for 2.5~3.5 hours by a thermocouple 4 in a tubular electric furnace 3 to thermally decompose tetraethoxysilane in the pores on the surface of the membrane to form and deposit $SiO_2$ to fill the pores.

Figure 2:
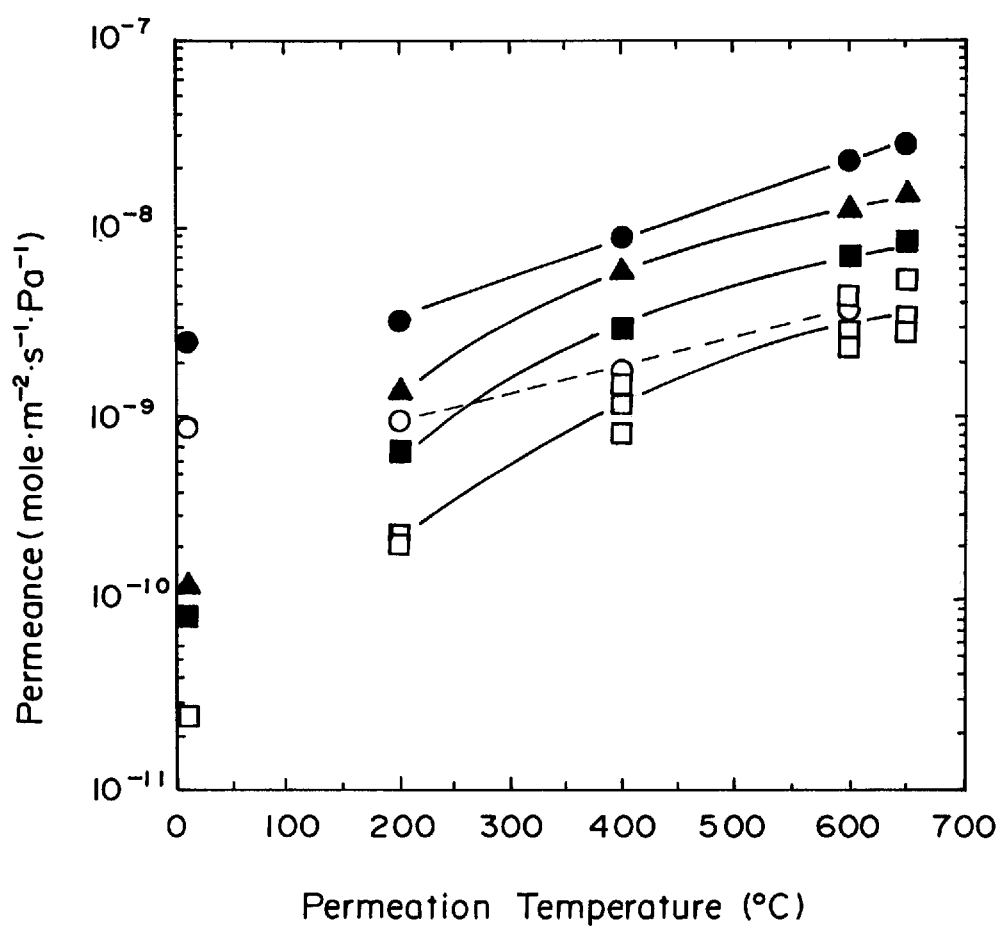
FIG. 2 is a diagram showing hydrogen gas permeances of $SiO_2$-deposited supports produced in Example 1.

FIG. 2 is a diagram showing the dependency of hydrogen gas permeability of the thus obtained $SiO_2$-supported porous α-alumina hollow filament membranes on permeation temperature, using the ultimate outlet pressure of the porous α-alumina hollow filament membrane as a parameter.

| Black circle mark   | ●: | outlet pressure | 60 Pa |
| Black triangle mark | ▲: | "               | 30 Pa |
| Black square mark   | ■: | "               | 20 Pa |
| White square mark   | □: | "               | 10 Pa |

In progress of $SiO_2$ formation and deposition from tetraethoxysilane, the outlet pressure of the membrane was decreased, and the hydrogen gas permeability of $SiO_2$-deposited porous α-alumina hollow filament membrane obtained under the ultimate outlet pressure of about 10 Pa was about $4\times10^{-9}$ mole/(m$^2$·sec·Pa) at a permeation temperature of 600° C., whereas the nitrogen gas permeability of the same SiO$_2$-deposited porous α-alumina hollow filament membrane was below $10^{-11}$ mole/(m$^2$·sec·Pa), which was the detection limit of gas chromatography used for the measurement.

When the reactor tube was heated to 600° C. and then tetraethoxysilane was introduced to conduct the reaction until the outlet pressure reached about 10 Pa, the resulting SiO$_2$-deposited porous α-alumina hollow filament membrane had the dependency of hydrogen gas permeance on permeation temperature shown by white circle mark ○ in FIG. 2, that is, the hydrogen gas permeance was increased at lower permeation temperatures.

Figure 3:
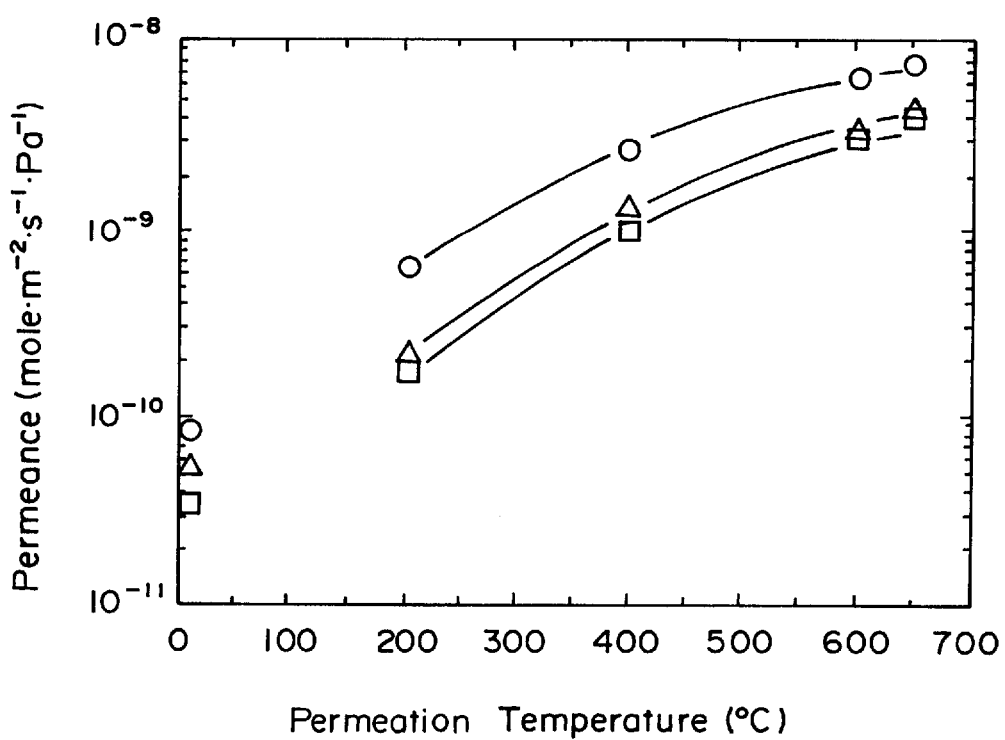
FIG. 3 is a diagram showing results of deterioration tests of $SiO_2$-deposited supports produced in Example 1, when exposed to high temperature steam.

SiO$_2$-deposited porous α-alumina hollow filament membrane obtained under the ultimate outlet pressure of 20 Pa, as shown by white circle mark ○ in FIG. 3, which corresponded to black square mark ■ in FIG. 2, was subjected to a high temperature deterioration test, using a gas mixture of nitrogen gas and steam in a volume flow rate ratio of about 10:1. That is, in FIG. 1 the nitrogen gas flow was changed to a flow through a flow rate controller 10' and a flow rate meter 18', and introduced into the space 16 through a thermally insulated line 17' together with steam generated from the heated water in the bubbler 5 as a gas mixture. Deterioration test with high temperature steam at 500° C. was carried out for 24 hours as shown by white triangle mark Δ or for 48 hours as shown by white square mark □ and hydrogen gas permeance before and after the test was measured.

The results are shown in FIG. 3. In the deterioration test for 24 hours, the hydrogen gas permeance was lowered to about one-half, but thereafter no progress of deterioration was observed. That is, the stability was confirmed. Furthermore, the stability was confirmed also against periodic changes in temperature.

EXAMPLE 2

In Example 1, the reactor tube 2 was heated to 650° C., and then tetraethoxysilane was introduced without evacuation of the membrane 1 for about 10 minutes, about 20 minutes or about 30 minutes to conduct pretreatment. Then, formation and deposition of SiO$_2$ from tetraethoxysilane were conducted until the ultimate outlet pressure reached about 10 Pa, while continuing the evacuation for about 20 minutes.

Figure 4:
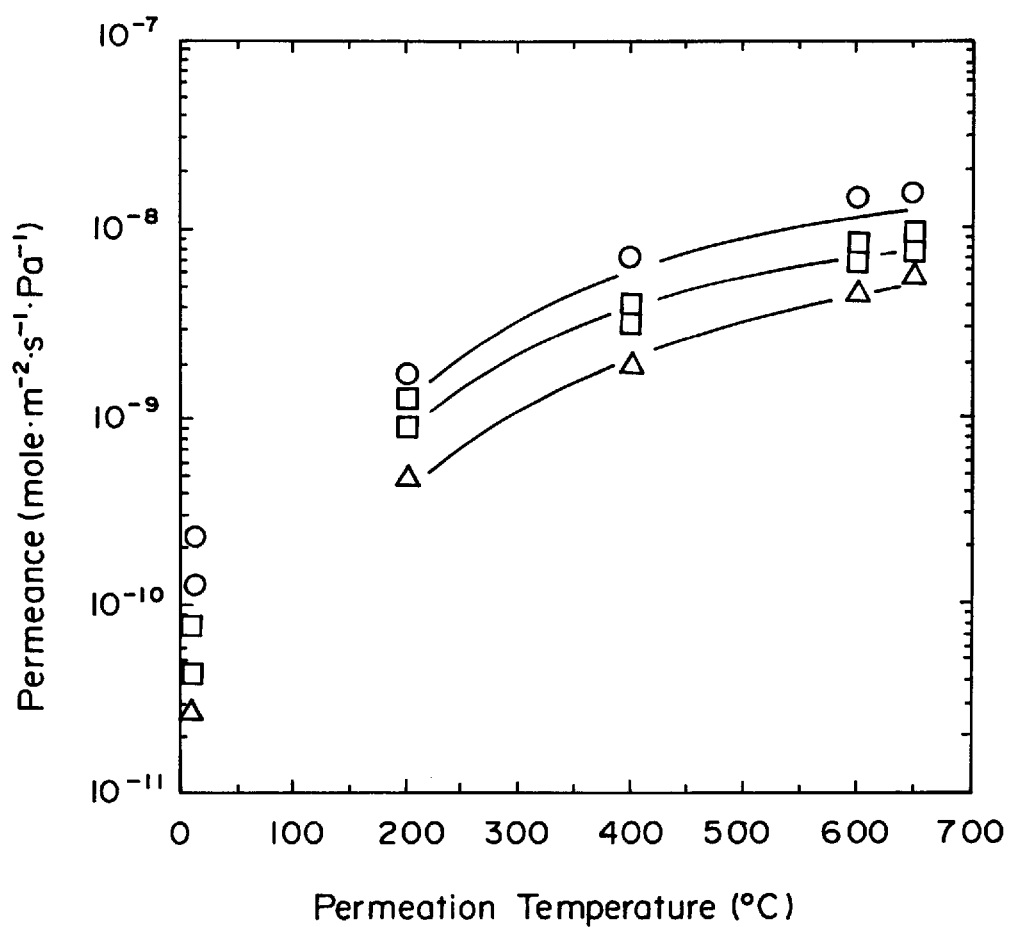
FIG. 4 is a diagram showing hydrogen gas permeances of $SiO_2$-deposited supports produced in Example 2.

The results are given in FIG. 4 as a diagram showing the dependency of SiO$_2$-deposited porous α-alumina hollow filament membranes obtained by the pretreatment for about 10 minutes (white square mark □: measurement of two samples), for about 20 minutes (white circle mark ○: measurement of two samples) and for about 30 minutes (white triangle mark Δ) on permeation temperatures. As is evident from FIG. 4, a hydrogen gas permeance of about $10^{-8}$ mole/(m$^2$·sec·Pa) was obtained at the permeation temperature of 600° C., whereas a nitrogen gas permeance, as likewise measured, was below $10^{-11}$ mole/(m$^2$·sec·Pa), which was a detection limit of the gas chromatography used for the measurement.

EXAMPLE 3

A CVD process was applied to the same porous α-alumina hollow filament membranes as in Example 1, but each with a γ-alumina thin film (film thichness: 1.5~2.5 μm; average pore size: 7 nm) formed on the surface of the membrane by a sol-gel process, as porous ceramic membrane supports in an apparatus as shown in FIG. 1, using tetraethoxysilane as a SiO$_2$ source and a quartz tube (inner diameter: 9.8 mm; length: 150 mm) as a reactor tube.

At first, a valve 15 downstream of a bubbler 5 is closed and the inside of the reaction system was evacuated by a rotary pump 6. Then, the valve 15 is opened, and tetraethoxysilane 9 in the bubbler 5 set in a water bath 8 heated by an electric heater 7 was introduced together with a nitrogen gas carrier into the space 16 between the outer side of the hollow filament membrane 1 and the reactor tube 2 at a nitrogen gas flow rate of $5.5\times10^{-5}$ mole/sec and at a tetraethoxysilane flow rate of $3.9\times10^{-8}$ mole/sec, whle continuing the evacuation by the rotary pump 6.

Under these conditions, the reactor tube 2 was heated to a reaction temperature (temperature in the uniformly heated region of reactor tube 2) of 300° C., 500° C. or 600° C. at a temperature elevation rate of 3.2° C./min. and kept constant at that temperature for 3 hours by a thermocouple 4 in a tubular electric furnace 3 to thermally decompose tetraethoxysilane in the pores on the surface of the membrane to form and deposit SiO$_2$ to fill the pores.

Figure 5:
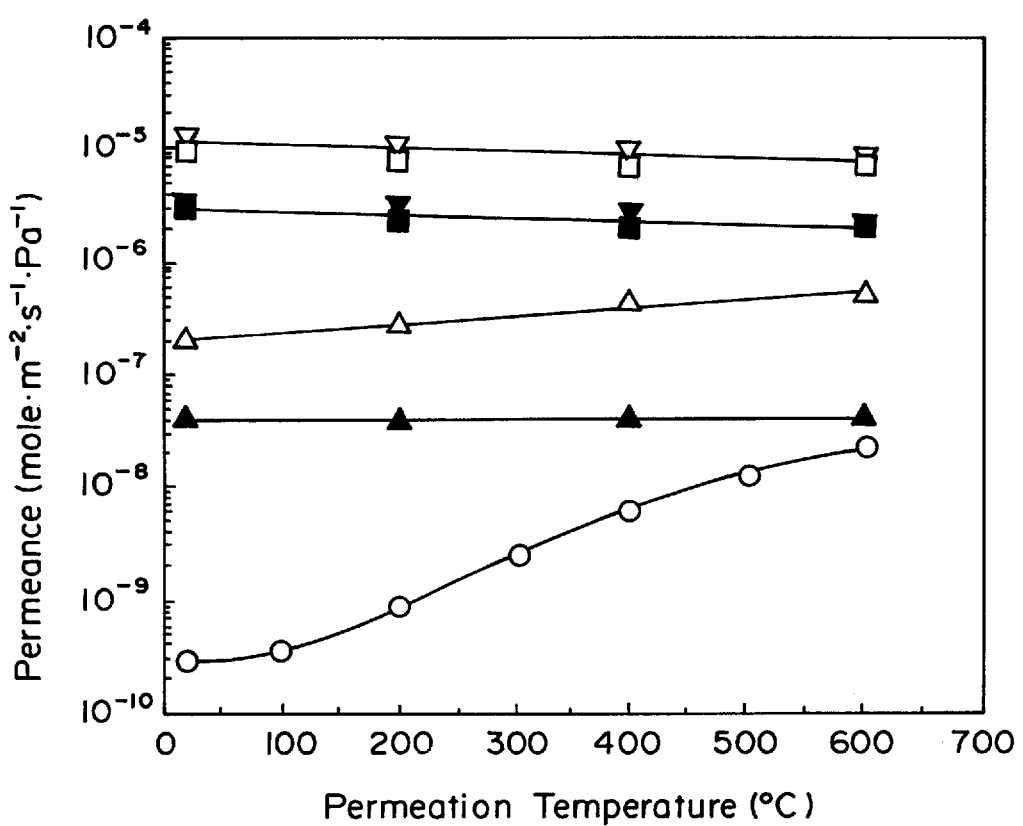
FIG. 5 is a diagram showing hydrogen gas and nitrogen gas permeances of $SiO_2$-deposited supports produced in Example 3.

FIG. 5 is a diagram showing the dependency of hydrogen gas permeance of the thus obtained SiO$_2$-supported porous α-alumina hollow filament membranes on permeation temperature, using the reaction temperature as a parameter, where

| | | |
|---|---|---|
| Inverted triangle mark | ▽: | Hydrogen gas permeance of support |
| Inverted black triangle mark | ▼: | Nitrogen gas permeance of support |
| White square mark | □: | Hydrogen gas permeance of SiO$_2$-deposited support (reaction temperature: 300° C.) |
| Black square mark | ■: | Nitrogen gas permeance of SiO$_2$-deposited support (reaction temperature: 300° C.) |
| White triangle mark | Δ: | Hydrogen gas permeance of SiO$_2$-deposited support (reaction temperature: 500° C.) |
| Black triangle mark | ▲: | Nitrogen gas permeance of SiO$_2$-deposited support (reaction temperature: 500° C.) |
| White circle mark | ○: | Hydrogen gas permeance of SiO$_2$-deposited support (reaction temperature: 600° C.) |

As is obvious from FIG. 5, the hydrogen gas permeance of SiO$_2$-deposited porous α-alumina hollow filament membrane obtained at the reaction temperature of 600° C. is $2\times10^{-8}$ mole/(m$^2$·sec·Pa) at the permeation temperature of 600° C., whereas the nitrogen gas permeance of the same SiO$_2$-deposited porous α-alumina hollow filament membrane is below the detection limit, $10^{-11}$ mole/(m$^2$·sec·Pa), of the gas chromatography used for the measurement. Thus it was confirmed to have a H$_2$/N$_2$ separation ratio of at least 2,000.

EXAMPLE 4

Figure 6:
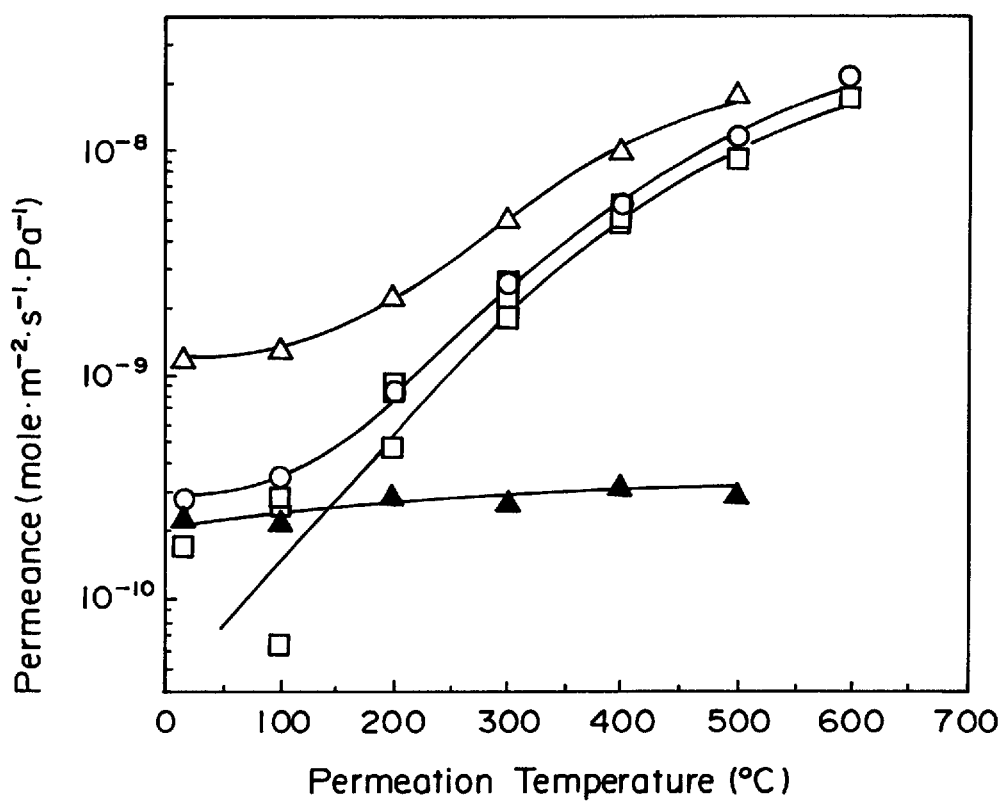
FIG. 6 is a diagram showing hydrogen gas and nitrogen gas permeances of $SiO_2$-deposited supports produced in Example 4.

In Example 3, the reaction time was changed to 2 hours, 3 hours or 4 hours, while keeping the reaction temperature constant at 600° C. The results are shown in FIG. 6, where

| White triangle mark | △: | Hydrogen gas permeance of SiO$_2$-deposited support (reaction time: 2 hours) |
|---|---|---|
| Black triangle mark | ▲: | Nitrogen gas permeance of SiO$_2$-deposited support (reaction time: 2 hours) |
| White circle mark | ○: | Hydrogen gas permeance of SiO$_2$-deposited support (reaction time: 3 hours) |
| White square mark | □: | Hydrogen gas permeance of SiO$_2$-deposited support (reaction time: 4 hours) |

Leakage of a small amount of nitrogen gas from the SiO$_2$-deposited porous α-alumina hollow filament membrane obtained for the reaction time of 2 hours was detected, but no leakage of nitrogen gas from the SiO$_2$-deposited membranes obtained for the reaction time of 3 hours or more was observed at all.

SiO$_2$-deposited porous α-alumina hollow filament membrane (SiO$_2$-deposited support) obtained by reaction at 600° C. for 4 hours was subjected to a deterioration test as in Example 1, except that water 13 in bubbler 5 was used in place of tetraethoxysilane 9 in bubbler 5, under the following test conditions to measure hydrogen gas permeances before and after the deterioration test, where White square, triangle and circle marks □, △ and ○: SiO$_2$-deposited supports

| Black square mark | ■: | Nitrogen-steam (93:7 by volume) gas mixture at 300° C. for 10 hours |
|---|---|---|
| Black triangle mark | ▲: | Nitrogen-steam (93:7 by volume) gas mixture at 500° C. for 15 hours |
| Black circle mark | ●: | Air at 500° C. for 15 hours |

Figure 7:
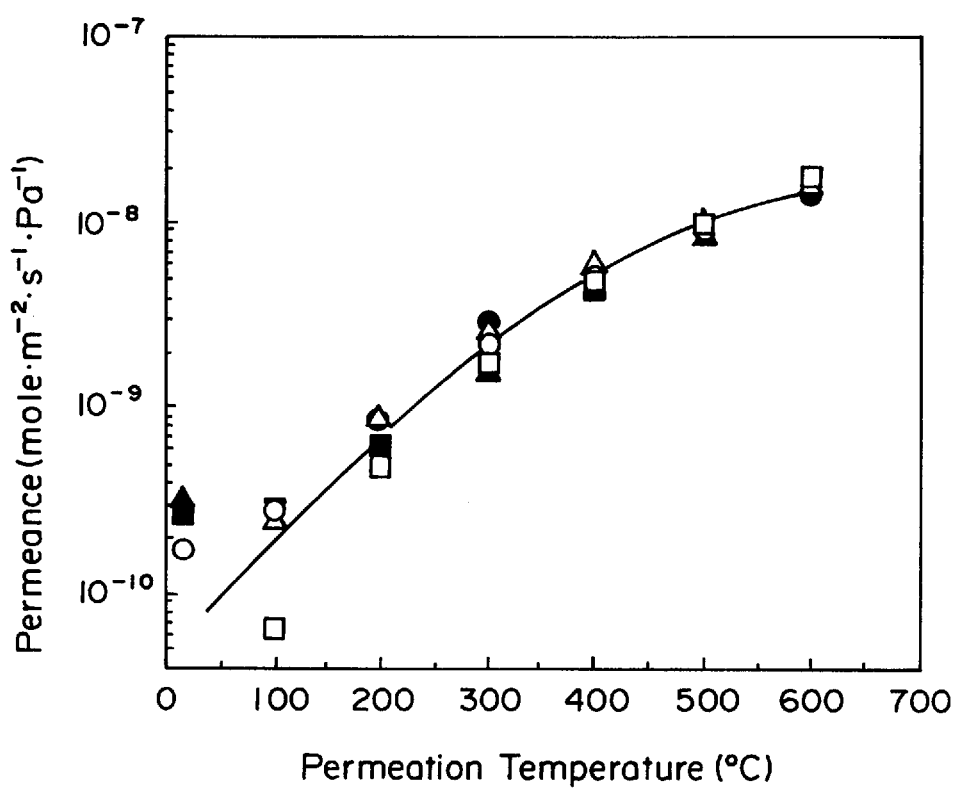
FIG. 7 is a diagram showing results of deterioration tests of $SiO_2$-deposited support produced in Example 4, when exposed to high temperature steam.

The results are shown in FIG. 7. Under all the test conditions, no changes were observed in the hydrogen gas permeance before and after the test. Furthermore, there were no substantial differences in the permeance of three samples of SiO$_2$-deposited porous α-alumina hollow filament membranes obtained under the same conditions, and thus it was found that there was good reproducibility in the SiO$_2$ deposition. Furthermore, the nitrogen gas permeances of these three samples were found to be all below the detection limit, $10^{-11}$ mole/(m$^2$·sec·Pa), of the gas chromatography used for the measurement.

EXAMPLE 5

Figure 8:
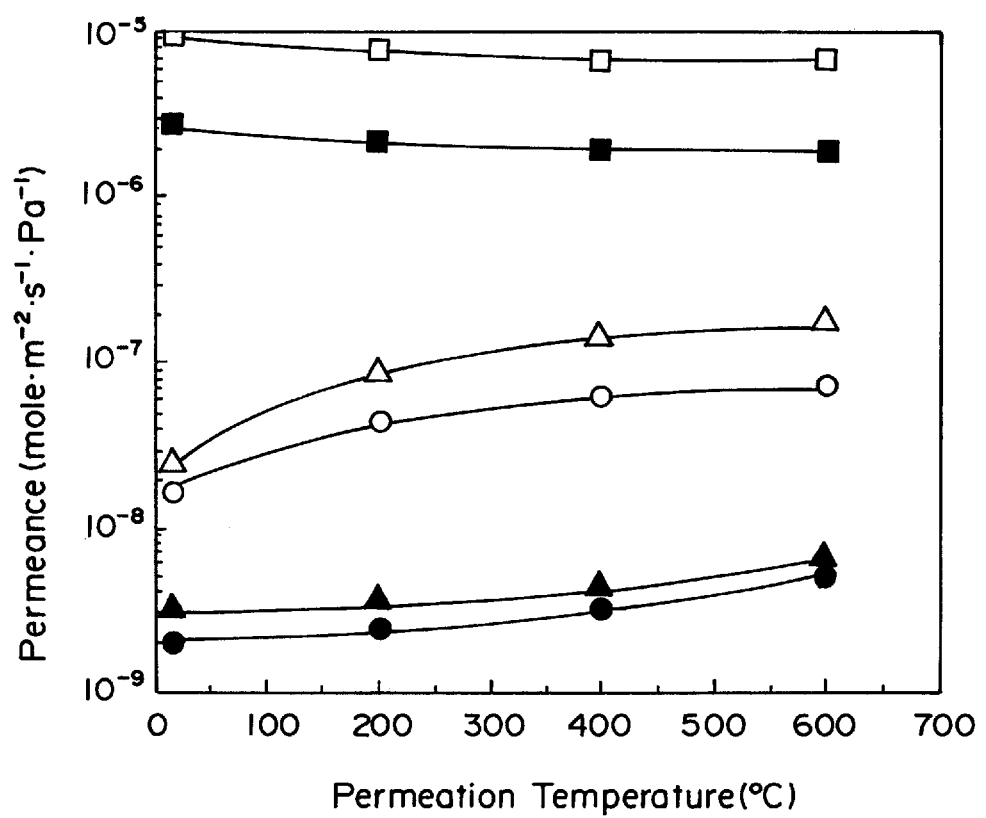
FIG. 8 is a diagram showing hydrogen gas and nitrogen gas permeances of $SiO_2$-deposited supports produced in Example 5.

In Example 3, the reaction time was changed to 3 hours, 45 hours or 100 hours, while keeping the reaction temperature constant at 400° C. The results are shown in FIG. 8, where

| White square mark | □: | Hydrogen gas permeance of SiO$_2$-deposited support (reaction time: 3 hours) |
|---|---|---|
| Black square mark | ■: | Nitrogen gas permeance of SiO$_2$-deposited support (reaction time: 3 hour) |
| White triangle mark | △: | Hydrogen gas permeance of SiO$_2$-deposited support (reaction time: 45 hours) |
| Black triangle mark | ▲: | Nitrogen gas permeance of SiO$_2$-deposited support (reaction time: 45 hours) |
| White circle mark | ○: | Hydrogen gas permeance of SiO$_2$-deposited support (reaction time: 100 hours) |
| Black circle mark | ●: | Nitrogen gas permeance of SiO$_2$-deposited support (reaction time: 100 hours). |

What is claimed is:

1. A process for producing a hydrogen separation membrane, which comprises:

positioning a porous ceramic membrane in a reactor having an inlet and an outlet, the inlet being in fluid communication with one side of the porous ceramic membrane and the outlet being in fluid communication with another side of the porous ceramic membrane;

introducing a vaporized SiO$_2$ source through the inlet and into pores of the porous ceramic membrane by suction established by providing a pressure difference between both sides of the porous ceramic membrane, the pressure difference effected by evacuating the reactor through the outlet;

and thermally decomposing the SiO$_2$ source, thereby forming, depositing and filling SiO$_2$ into the pores and fully coating the outer surface of the membrane with a SiO$_2$ thin film simultaneously.

2. A process according to claim 1, wherein the porous ceramic membrane comprises a ceramic having an average porosity of about 20 to about 60%, and an average pore size of about 5 to about 5,000 nm.

3. A process according to claim 1, wherein the porous ceramic membrane comprises a ceramic having an average porosity of about 40 to about 60%, and an average pore size of about 50 to about 500 nm.

4. A process according to claim 1, wherein the SiO$_2$ source is a tetra(lower alkoxy)silane.

5. A process according to claim 1, wherein the SiO$_2$ source is produced by a chemical vapor deposition process.

6. A process for producing a hydrogen separation membrane according to claim 1, wherein, the pressure difference comprises a subatmospheric pressure which is applied to the outlet.

7. A process for producing a hydrogen separation membrane, which comprises:

coaxially fixing a porous ceramic hollow filament membrane in a reactor tube so that an inlet of the reactor tube is in fluid communication with an outer side of the porous ceramic hollow filament membrane and an outlet of the reactor tube is in fluid communication with an inner side of the porous ceramic hollow filament membrane;

evacuating the reaction tube, thereafter:

introducing a vaporized SiO$_2$ source through the inlet and into a space between the outer side of the hollow filament membrane and the reactor tube;

depositing and filling the vaporized SiO$_2$ source into pores of the porous ceramic membrane by suction established by providing a pressure difference between both sides of the porous ceramic hollow filament membrane, the pressure difference effected by evacuating the reactor tube through the outlet; and fully coating the outer surface of the porous ceramic hollow filament membrane with a SiO$_2$ thin film.

8. A process according to claim 7, wherein the reactor tube is heated to at least about 500° C.

9. A process according to claim 7, wherein the reactor tube is heated to at least about 600° C.

10. A process according to claim 7, wherein the vaporized $SiO_2$ source is deposited under a pressure of about 0.5 to about 5 kPa.

11. A process according to claim 7, wherein the $SiO_2$ source is introduced into the space together with a nitrogen carrier gas.

12. A process according to claim 7, wherein the $SiO_2$ source is heated to a heating temperature of the reactor tube in advance and then introduced into the space together with a nitrogen carrier gas.

13. A process according to claim 7, wherein after the $SiO_2$ source is introduced into the space, the outer surface of the porous ceramic membrane is pretreated with the $SiO_2$ source for a predetermined time without the evacuation, and then $SiO_2$ is formed, deposited and filled into the pores while conducting the evacuation.

14. A process for producing a hydrogen separation membrane according to claim 7, wherein, the pressure difference comprises a subatmospheric pressure which is applied to the outlet.

* * * * *